United States Patent [19]

Torto et al.

[11] 4,403,856
[45] Sep. 13, 1983

[54] OFFICE COPIER WITH ARTICULATED HINGE COVER

[75] Inventors: Nicholas L. Torto, Burlington; Samuel R. Di Nallo, Sr., Framingham, both of Mass.

[73] Assignee: Coulter Systems Corporation, Bedford, Mass.

[21] Appl. No.: 413,977

[22] Filed: Sep. 1, 1977

Related U.S. Application Data

[62] Division of Ser. No. 126,535, Mar. 3, 1980, Pat. No. 4,386,847.

[51] Int. Cl.³ .............................................. G03B 27/62
[52] U.S. Cl. ......................................... 355/75; 355/25
[58] Field of Search .................... 49/371, 399; 217/57; 211/169.1; 355/75, 76, 25

[56] References Cited

U.S. PATENT DOCUMENTS

| | | | |
|---|---|---|---|
| 3,504,973 | 4/1970 | Kolibas et al. | 355/75 |
| 3,630,620 | 12/1971 | Fackler | 355/76 |
| 3,642,376 | 2/1972 | Halvorsen et al. | 355/75 X |
| 3,997,265 | 12/1976 | Menon et al. | 355/75 |
| 4,035,077 | 7/1977 | Vercoulen | 355/25 X |
| 4,110,041 | 8/1978 | Luperti et al. | 355/75 |
| 4,154,527 | 5/1979 | Schnall et al. | 355/75 |
| 4,157,222 | 6/1979 | Ishihara | 355/75 |
| 4,172,660 | 10/1979 | Yanofsky et al. | 355/75 |
| 4,184,765 | 1/1980 | Breuers | 355/75 |

Primary Examiner—Richard A. Wintercorn
Attorney, Agent, or Firm—Silverman, Cass & Singer, Ltd.

[57] ABSTRACT

A hinge link connecting a cover to an office copier machine is completely enclosed by the cover when the cover is swung down in a closed position on the copier machine. One edge of the hinge link is connected to the top of the copier machine by a first pivotal joint and an opposed edge of the hinge link is connected to the cover by a second pivotal joint. The two pivotal joints permit the cover to be swung open around the first pivotal joint and enable the cover to be disposed substantially parallel to the copier top to accommodate articles of varying thickness placed between a platen on the top of the copier and the cover. The hinge link may be planar or it may be angular. In the latter case, the short leg of the angle is substantially the height of the cover with the other leg having a length greater than the short leg to permit the hinge link to be totally enclosed within the chamber of the cover and to enable the cover to be disposed spaced from the copier top.

12 Claims, 8 Drawing Figures

OFFICE COPIER WITH ARTICULATED HINGE COVER

This is a division of application Ser. No. 126,535 filed Mar. 3, 1980, now U.S. Pat. No. 4,386,847.

BACKGROUND OF THE INVENTION

This invention relates to hinged covers and in particular relates to articulated hinged covers for copying machines used in offices and the like locations.

An office copying machine generally provides a rectangular platen framed by the chassis of the machine. Articles to be copied are placed face down on the platen in order to enable illumination of the article from the interior of the chassis for imaging purposes. A swinging cover is provided on top of the copier chassis to be swung down to a position covering the platen and to be swung up to an open position to allow articles to be placed on the platen.

In the closed position, the cover may urge an article on the platen into close contact with the platen to obtain a better copy and in the closed position the cover protects the platen which is usually made of photographic glass from scratches which would be reproduced by the copier. In the closed position the copier also protects the user from the strong illumination normally required by modern copiers.

When the cover is in the open position, articles may be removed from and placed on the platen.

Copying of articles thicker than a few sheets of paper such as books, magazines, etc., poses problems in the design and construction of copier covers. A cover which is hinged with only one pivot along an edge thereof cannot be moved to lie flat against the platen, the thickness of the articles preventing such disposition. In this case, the free end of the cover usually is left spaced from the platen with the cover forming an angle with the platen, the angle being determined by the thickness of the article being copied.

U.S. Pat. Nos. 4,157,222 and 3,630,620 disclose covers for copier platens which are essentially plates hinged at their rear margin to accommodate articles of varying thickness. U.S. Pat. No. 4,157,222 includes an attaching portion 14 secured to the copier top adjacent a rear edge of the platen, a narrow portion 20 being hinged to the attaching portion 14 and a hold-down portion 16 being hinged to the narrow portion 20. Hold-down portion 16 extends over and covers the platen. The two joints connecting the narrow portion 20 with the attaching portion 14 and the hold-down portion 16 permit the hold-down portion 16 to be disposed above the platen over articles of varying thickness in substantially parallel relationship to the platen. U.S. Pat. No. 3,630,620 provides a cover 12 having two like rectangular plate-like members 31 and 32 hinged along a common joint 34 and covering a copier platen. The rearmost edge of plate 31 is connected to a support bracket 41 by a hinge 44 with bracket 41 being connected to a joint 42 spaced above the plane of the platen at the rear of the platen.

In both of these patents, opening the cover and closing it on articles of varying thickness is awkward because of the two freely swinging joints.

U.S. Pat. No. 3,997,265 discloses a cover 10 formed of a box-like housing 22 having an open ended chamber 34 facing downward on a platen 12. Housing 22 has a substantial height to accommodate an inner member 26 disposed within the chamber 34 in parallel relationship to the platen 12, member 26 being slidably connected in the interior of the cover 10 to accommodate articles of varying thickness while the lower peripheral edges of the cover remain in contact with the copier top. The cover 10 is hinged at its rear lower edge to the copier top which enables the cover to be opened and closed around that one hinge, but the cover has a substantial height above the copier top to accommodate articles of varying thickness in addition to the inner member 26 and its associated mounting hardware.

The invention herein provides a cover which is easily opened around a single pivot at the rear of the cover and which is closed over articles of varying thickness while maintaining a low profile on a copier top.

SUMMARY OF THE INVENTION

In accordance with the invention an articulated hinge with two pivotal joints is provided to be installed in the interior of a copying machine cover. The cover is rigid with depending peripheral portions defining a downwardly opening chamber which in a closed position is generally aligned with and covers a rectangular platen on the top of the copier.

The first pivotal joint of the hinge is connected to the copier top adjacent a rear margin of the platen. The second joint of the hinge is connected to the planar portion of the cover but is spaced from one edge thereof. The lower edge of the depending peripheral portion of the cover adjacent the first joint rests on the first joint so that opening and closing of the cover may occur substantially around only the first joint. When the cover is closed over an article of substantial thickness, rotation of the cover around the first joint occurs until the cover engages the article at which time the cover is pivoted around the second pivot to obtain a disposition of the cover above the platen which is substantially parallel thereto.

The hinge link may be planar or it may be angular in which case the length of one leg connected to the first hinge joint is substantially the height of the depending peripheral portions of the cover to allow the entire hinge to be contained within the cover chamber when the cover is closed. In this latter case, another leg connected to the second pivot is substantially longer than the one leg to provide the disposition of the cover spaced from the platen.

A layer or member of resilient foamed material may be provided inside the cover to accommodate articles having an irregular configuration and apply even pressure to said articles when mounted against the platen.

DESCRIPTION OF THE PREFERRED EMBODIMENTS

Figure 1:
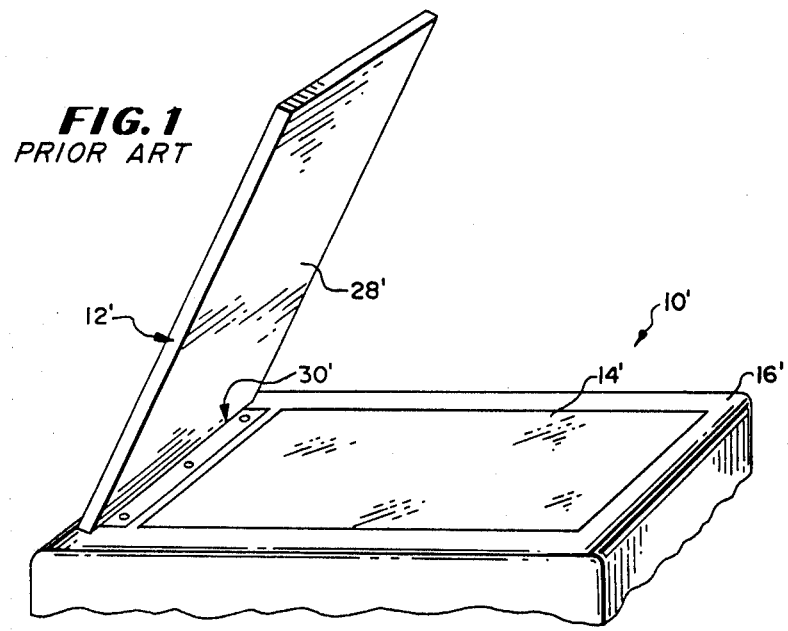
FIG. 1 is a perspective view of the upper portion of a prior art office copier machine showing the rigid cover in an open position.
Figure 2:
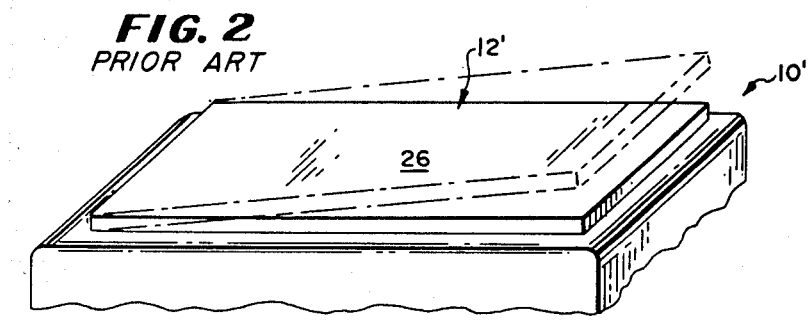
FIG. 2 is a perspective view of the upper portion of the prior art office copier machine of FIG. 1 showing the rigid cover member in two closed positions.

FIGS. 1 and 2 illustrate in somewhat simplified form a typical prior art copier machine 10' having a hinged cover 12' secured by means of the hinge 30' to the upper framing structure 16' of the copier 10'. The hinge 30' is shown on the left and in normal use where a single thickness document or the like is laid flat onto the transparent platen 14', the cover member 12' will swing downward from the position shown in FIG. 1 in a clockwise movement to the position shown in FIG. 2. This position presses the underside 28' which may be made of yieldable material against the document holding same tightly engaged against the platen 14'. Light which originates on the interior of the machine 10' below the platen 14' is confined so that the operator's eyes are not exposed.

If an article thicker than a single document is placed on the platen 14' to be imaged, the cover member 12' cannot lie flat and will be somewhat raised as indicated by the broken lines of FIG. 2. Light escapes and the article is not held flat against the platen 14'. This assumes a relative rigid cover member 12'. Flexible cover members pose other problems.

In exterior appearance a copier machine 10 which is constructed in accordance with the invention may not differ from the copier machine 10'. Its cover member 12 may be somewhat thicker to accommodate the articulated hinge to be described. Accordingly it can be understood that a perspective view of the copier machine 10 of the invention will not differ substantially from FIG. 2.

Cover 12 includes four peripheral portions 18, 20, 22 and 24 depending from the four sides of rectangular planar portion or plate 26. Planar portion 26 and peripheral portions 18, 20, 22 and 24 form a downwardly opening chamber 28' generally aligned with and above platen 14 and of a size to cover the platen. In the chamber, a member 28 of resilient foamed material is located to urge articles having an irregular surface configuration into close contact with platen 14. A first hinge joint 30 is connected to the framing portion 16 adjacent a rear margin of platen 14 hingedly to connect cover 12 to the framing portion 16.

The cover 12 is capable of being rotated to an open position around first hinge joint 30 with the free opposite end of cover 12 represented by peripheral portion 20 being lifted away from platen 14 and framing portion 16. In a closed position, the lower edges of the four depending peripheral portions 18, 20, 22 and 24 are in contact with framing portions 16 with the first hinge joint 30 being included in the downwardly opening chamber 28' formed by cover 12.

Figure 3:
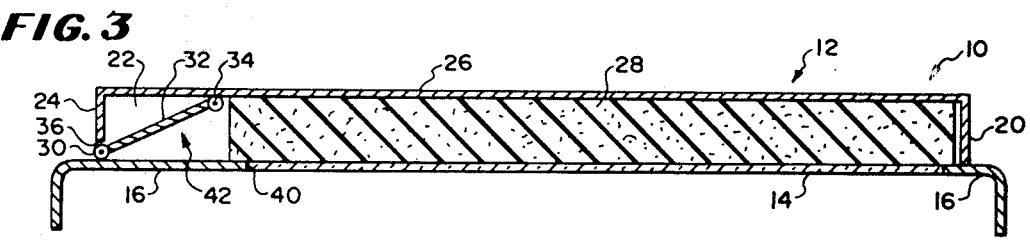
FIG. 3 is a median cross-sectional view of the upper part of a copier having an articulated cover member similar to that of FIG. 2 but showing one embodiment of the invention.
Figure 4:
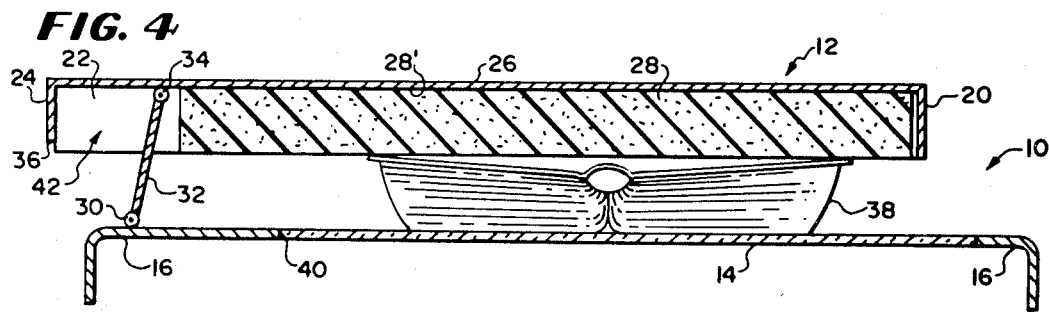
FIG. 4 is the same view as shown in FIG. 3 but illustrating the effect of placing a book between the articulated cover and copier platen.

In FIGS. 3 and 4, first hinge joint 30 is shown connected along one edge of an elongate, substantially planar hinge linke 32 which extends substantially along the length of peripheral portion 24 transversely of the cover 12. An edge of hinge link 32 opposite first hinge joint 30 is connected to a second hinge joint 34 which is in turn connected to planar portion 26 of cover 12.

Hinge joints 30 and 34 are parallel with each other, extend substantially the length of planar hinge link 32 and may be piano hinges. The lower edge 36 of dependent peripheral portion 24 may rest on the first hinge joint 30 so that when cover 12 is opened by an upward counterclockwise movement, the cover rotates around the first hinge joint 30 and not the second hinge joint 34, the weight of cover 12 urging lower edge 36 against first joint 30 and preventing rotation of cover 12 around second joint 34. This provides the feature of double-hinged or articulated cover 12 functioning like a single-hinged cover for use with flat articles.

The two hinge joints 30 and 34 are capable of independent swinging movement although when the cover member 12 is in engagement with the framing portion 16 the only swinging movement possible is that revolving counterclockwise about the hinge joint 30. Once the cover member 12 has been raised, however, it may additionally be rotated in a clockwise direction as permitted by the degree of counterclockwise movement which has been imparted to the hinge link 32. Articulated movement thus enables the cover member 12 to assume a parallel disposition relative to the platen 14 at any of a large number of distances from the platen 14. In FIG. 4 a book 38 has been laid against the platen 14 and it can be seen that the cover member 12 engages the back of the book and enables the operator to press it evenly against the platen. The cover member remains flat and parallel to the platen 14 during this operation.

In FIGS. 3 and 4, the first hinge joint 30 is shown spaced from the rear margin 40 of platen 14 so that there is sufficient room for hinge link 32 and second hinge joint 34 to be connected to cover 12 without interfering with the member 28 of foamed material which is substantially in registration with platen 14 when the cover 12 is in the closed position. It will be appreciated that as the thickness of the articles that it is desired to place on platen 14 to be covered by cover 12 is increased, the distance across the planar hinge link 32 must also be increased and as a consequence thereof, the space 42 surrounding both, pivotal hinge joints and the hinge link must also be increased.

Figure 5:
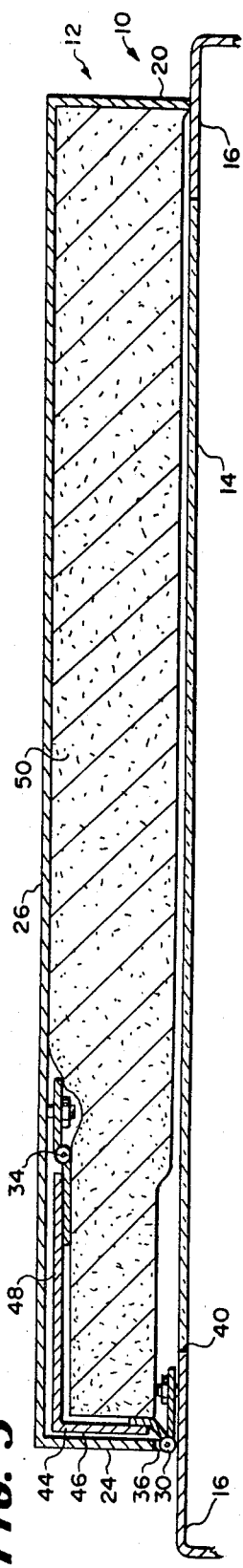
FIG. 5 is a cross-sectional view of the articulated cover and copier top similar to that of FIG. 3 but showing another embodiment of the invention.
Figure 6:
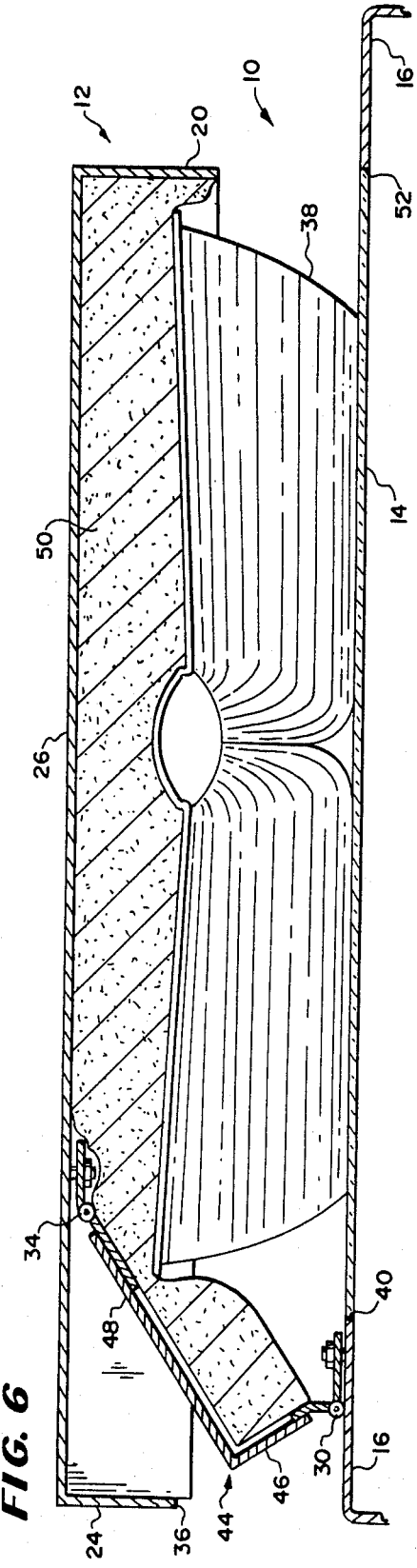
FIG. 6 is the same view as shown in FIG. 5 but showing the arrangement of parts when a book is placed between the cover and platen.

Another embodiment of the invention is illustrated in FIGS. 5 and 6 in which angular hinge link 44 is connected between first and second pivotal hinge joints 30 and 34. Angular hinge link 44 includes first and second legs 46 and 48, which are substantially planar and have a right angle bend between them. Angular hinge link 44 extends substantially the length of depending portion 24 and when cover 12 is in the closed position, hinge link 44 and first and second hinge joints 30 and 34 are substantially contained within the chamber 28' formed by cover 12.

As shown in FIG. 5, hinge link 44 is arranged relative to cover 12 with leg 46 adjacent peripheral portion 24 and leg 48 adjacent planar portion 26. This enables the member 50 of foamed material to extend within the chamber 28' formed by cover 12 closely adjacent hinge link 44, and enables first pivotal joint 30 to be connected to framing portion 16 closely adjacent the marginal edge 40 of platen 14.

First leg 46 is substantially the height of depending peripheral portion 24 so that, although articulated, the cover 12 may be contained in a low profile on top of the copier 10. Second leg 48 is longer than first leg 46 to allow the cover 12 to be disposed above platen 14 to accommodate thick articles such as book 38, shown in FIG. 6. It should be noted that the length of leg 48 may be any desired dimension to accommodate articles of great thickness while the length of leg 46 may be maintained relatively short, to maintain a low profile cover. These dimensional designations of length refer to the distance transverse of the link between hinge points.

As with the planar hinge link 32 of FIGS. 3 and 4, lower edge 36 of depending peripheral portion 24 rests on or is closely adjacent first pivotal hinge joint 30 so that when cover 12 is opened, it rotates only around first pivotal hinge joint 30, providing for a smooth opening and closing of cover 12.

FIG. 6 illustrates how cover 12 with hinge link 44 may be disposed above an article having substantial thickness such as book 38 with planar portion 26 disposed substantially parallel to platen 14. The member 50 of foamed material conforms to irregularities in the top surface of book 38 and is therefore shown modified from it substantially rectangular cross-sectional shape of in FIG. 5. It should be noted that depending peripheral portion 20 at the front of cover 12 is still substantially in alignment with the front margin 52 of platen 14.

First and second pivotal hinge joints 30 and 34 may be attached to their respective framing portion 16 and planar portion 26 by fasteners such as nuts and bolts or may be fastened by bonding such as by spot welding. Angled hinge link 44 may be connected to first and second pivotal hinge joints 30 and 34 by the same means.

Figure 8:
FIG. 8 is a side elevational view of the hinge link of FIG. 7.
Figure 7:
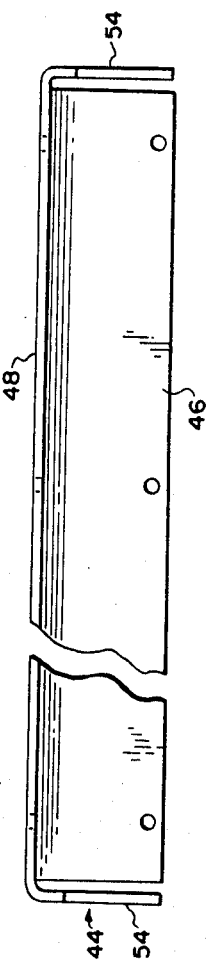
FIG. 7 is a front elevational view of the articulated hinge link shown in FIGS. 5 and 6.

Angled hinge link 44 may have depending reinforcing portions 54 which are substantially perpendicular to the legs such as is shown in FIGS. 7 and 8, to provide dimensional stability for the hinge link against bending or forces applied thereto by cover 12. Reinforcing portions 54 are shown depending from leg 48, but of course they could depend from leg 46 and they could be formed in the length of the hinge link instead of at the ends thereof.

Returning to FIGS. 5 and 6, it is important to note that the length of leg 46 transverse of the hinge link is substantially the length of depending portion 24. This enables cover 12 to have a narrow profile on the copier top. Leg 48, however, may have any transverse dimension desired, the distance that cover 12 may be disposed above platen 14 being determined by the distance between first and second pivotal hinge joints 30 and 34 which is the hypotenuse of the right triangle formed by perpendicular legs 46 and 48 of angled hinge link 44.

Hinge links 32 and 44 have been described with second pivotal hinge joint 34 being spaced from depending portion 24. This provides for a slight translation of cover 12 to the rear of the copier and in some cases, the front depending portion 20 may overlay platen 14 allowing illumination from the interior of the copier to leak out from underneath the cover. Of course, the arrangement of hinge links 32 and 44 could be recersed with second pivotal joint 34 closely adjacent depending portion 24 and with the first pivotal joint 30 spaced therefrom so that cover 12 will be slightly translated forward of the copier when thick articles are placed between the cover 12 and platen 14. An extension at the front of the cover may obviate the problem.

Modifications and variations of the present invention are possible in light of the above teachings. It is therefore to be understood that within the scope of the appended claims, the invention may be practiced otherwise than as specifically described.

What is claimed and desired to be secured by Letters Patent is:

1. In an electrostatic document copier chassis having a framing structure and an upwardly facing rectangular platen framed by said structure, said platen adapted to receive thereon an article such as a document or the like with a surface of said article facing downwardly against the platen in order to enable illumination of said surface from the interior of the chassis for imaging purposes, a cover member having an articulated connection with said framing structure and adapted for covering the article when the latter is in imaging position and accommodating to different thicknesses of respective articles being imaged, said cover member and articulated connection comprising:
   A. a rigid inverted tray-like member having peripheral walls defining a downwardly opening chamber and of a size and configuration normally to overlie the platen,
   B. a hinge link concealed within the traylike member and coupling said member to said framing structure for articulated swinging movement relative to said platen,
      i. said hinge link having a first pivotal connection with said tray-like member on its interior defining a first axis parallel with an end peripheral wall thereof,
      ii. and having a second pivotal connection with the framing structure at an end of said platen defining a second axis parallel with and spaced from said first axis,
      iii. said first pivotal connection being the higher and innermost one of said pivotal connections, the second pivotal connection being the lower and outermost of said pivotal connections, said first pivotal connection being in a plane spaced horizontally above the horizontal plane of the second pivotal connection, said pivotal connections being independently connected to said framing structure and inside of said cover member parallel said end peripheral wall,
   C. the resulting articulated connection enabling accommodation of articles of different thickness on the platen covered by said tray-like member while said latter member remains substantially parallel with said platen with minimization of lateral translational movement of said cover relative to said platen.

2. The invention as claimed in claim 1 in which said first axis is spaced substantially from said end peripheral wall.

3. The invention as claimed in claim 1 in which said end peripheral wall is substantially aligned with said second axis.

4. In an electrostatic document copier chassis having a framing structure and an upwardly facing rectantular platen framed by said structure, said platen adapted to receive thereon an article such as a document or the like with a surface of said article facing downwardly against the platen in order to enable illumination of said surface from the interior of the chassis for imaging purposes, a swinging cover member having a concealed connection with said framing structure and adapted for covering the article when the latter is in imaging position and accommodating to different thicknesses of respective articles being imaged, said swinging cover member and connection comprising:
   A. a rigid cover member including a generally rectangular planar plate with depending peripheral portions defining a downwardly opening chamber generally aligned with and above said platen and of a size to cover at least said platen, B. hinge means for connecting said rigid cover member along one edge thereof with said framing structure, said hinge means and configuration of said rigid cover member being such that the plate is spaced from and parallel with said platen when the peripheral portions are substantially engaged against said framing structure, and said hinge means being substantially contained within said chamber when said peripheral depending portion is substantially engaged against said framing structure, said hinge means comprising:
  i. an elongate articulated hinge link extending between the rigid cover member and the framing structure,
  ii. a first pivotal joint between the hinge link and said framing portion, said first pivotal joint being the lower and outermost of said pivotal joints, and
  iii. a second pivotal joint between the hinge link and said rigid cover member, said second pivotal joint being the upper and innermost of said pivotal joints, both of said joints being rotatable on axes parallel with one another and spaced apart,
  iv. said first pivotal connection being in a plane spaced horizontally below the horizontal plane of the second pivotal connection, said pivotal connections being independently connected to said framing structure and inside of said cover member parallel said end peripheral wall, C. the rigid cover member thereby being swingable relative to said framing structure and capable of assuming dispositions relative to said platen at varying distances above said platen with minimal lateral translation of said cover relative to said platen to accommodate while substantially covering respective articles of varying thickness placed upon said platen, said hinge means being concealed within said cover member when said cover member is engaged against said framing structure.

5. The invention as claimed in claim 4 in which the lower edge of the rear depending peripheral portion adjacent said one edge is adjacent the first pivotal joint so as to conceal the hinge link with said rigid cover member when said rigid cover member is engaged against said framing structure.

6. The invention as claimed in claim 5 in which said pivotal joints are of the piano hinge type.

7. The invention as claimed in claim 5 in which said lower edge rests above the first pivotal joint.

8. The invention as claimed in claim 4 in which said hinge link and pivotal joints extend substantially the length of said one edge.

9. A hinge link for coupling a cover member to the top of an electrostatic copier machine adjacent a transparent platen against which a document or the like article is adapted to be engaged, the copier machine having a framing structure around the platen and the cover member being of a configuration adapted to overlie the platen and generally having a rigid inverted shallow rectangular tray having peripheral end walls, the hinge link comprising an elongate metal member having opposite edges, hinge joint means on said opposite edges adapted independently to be connected to said framing structure and the inside of said cover member parallel one peripheral end wall, said hinge joint means including first and second hinge joints, said first hinge joint being the innermost of said hinge joints and located higher than said second hinge joint, the second hinge joint being the outermost of said hinge joints, the first hinge joint being located in a plane spaced horizontally above the horizontal plane of the said second hinge joint, said hinge providing a pair of pivoting axes parallel to one another and spaced apart whereby if so connected between said cover member and said framing structure the cover member will be articulated and able to accommodate articles of different thickness between itself and the platen while remaining substantially parallel with said platen.

10. The hinge link according to claim 9 characterized in that the metal member is flat and planar.

11. The hinge link as claimed in claim 9 characterized in that the arms have different widths.

12. The hinge link as claimed in claim 9 characterized in that the tray is rigid overall and the peripheral walls define a donwardly opening chamber of a size and configuration normally to overlie the platen, said hinge joint means being concealed within the tray.

* * * * *